United States Patent
Yagi

(10) Patent No.: US 8,203,740 B2
(45) Date of Patent: Jun. 19, 2012

(54) IMAGE PROCESSING APPARATUS, DISTRIBUTION MANAGEMENT METHOD, AND RECORDING MEDIUM

(75) Inventor: Atsuko Yagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 744 days.

(21) Appl. No.: 12/355,232

(22) Filed: Jan. 16, 2009

(65) Prior Publication Data

US 2009/0185219 A1  Jul. 23, 2009

(30) Foreign Application Priority Data

Jan. 21, 2008 (JP) ................................ 2008-010521

(51) Int. Cl.
*G06F 3/12* (2006.01)
*H04N 1/60* (2006.01)

(52) U.S. Cl. ........................................ 358/1.15; 358/1.9

(58) Field of Classification Search ................. 358/1.15, 358/448, 1.9; 713/182; 726/18, 19, 28; 715/716; 703/3; 345/146

See application file for complete search history.

(56) References Cited

U.S. PATENT DOCUMENTS

| 7,039,861 | B2 | 5/2006 | Yagi | |
| 7,185,007 | B2 | 2/2007 | Yagi | |
| 2001/0046068 | A1* | 11/2001 | Honda | 358/1.16 |
| 2004/0172272 | A1* | 9/2004 | Shillinglaw et al. | 705/1 |
| 2005/0024355 | A1 | 2/2005 | Yagi | |
| 2006/0041896 | A1 | 2/2006 | Yagi | |
| 2006/0290658 | A1* | 12/2006 | Konuma et al. | 345/156 |
| 2007/0260591 | A1* | 11/2007 | Ahi et al. | 707/3 |
| 2007/0288887 | A1* | 12/2007 | Pepin et al. | 717/105 |
| 2008/0068638 | A1 | 3/2008 | Yagi | |
| 2009/0013252 | A1* | 1/2009 | DeWitt | 715/716 |
| 2010/0275032 | A1* | 10/2010 | Bhangi | 713/182 |

FOREIGN PATENT DOCUMENTS

| JP | 2003-324574 | 11/2003 |
| JP | 2004-222141 | 8/2004 |
| JP | 2005-208934 | 8/2005 |
| JP | 4115285 | 4/2008 |

* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

A process-flow calling unit calls existing flow definition data defining a process flow of image data from a distribution management apparatus connected via a network. A list display unit displays thereon a list of existing flow definition data called by the process-flow calling unit. A process-flow generating unit generates new flow definition data, when desired flow definition data does not exist in the list displayed on the list display unit.

15 Claims, 9 Drawing Sheets

```
<?xml version= "1.0" encoding= "Shift_JIS" ?>
<flow_path>
    <item>
        <type>OCR</type>
        <next>
            <item>
                <type>Archive</type>
                <next>
                    <item>
                        <type>SMTP</type>
                    </item>
                </next>
            </item>
            <item>
                <type>WebDAV</type>
            </item>
        </next>
    </item>
</flow_path>
```

IMAGE PROCESSING APPARATUS, DISTRIBUTION MANAGEMENT METHOD, AND RECORDING MEDIUM

CROSS-REFERENCE TO RELATED APPLICATIONS

The present application claims priority to and incorporates by reference the entire contents of Japanese priority document 2008-010521 filed in Japan on Jan. 21, 2008.

BACKGROUND OF THE INVENTION

1. Field of the Invention

The present invention relates to a technology for generating flow definition data defining a process flow of image data.

2. Description of the Related Art

Recently, in many companies, an image input/output device such as a digital multifunction product has been arranged and connected to a network. The image input/output device works as an important unit that improves business efficiency. Particularly, the distribution management system that efficiently performs computerization and distribution of paper documents has been important. A key element constituting this system is an image input unit (scanner) and a distribution server. A plurality of distribution processing menus matched with various business operations and applications is registered beforehand in the distribution server. A user selects a processing menu suitable for his business operation from an operation panel (operation unit) of the scanner to perform scanning. In a current general distribution management system, a flow adapted for a purpose is selected by a user from the distribution processing menus registered in the distribution server to perform scanning.

"Electronic mail system" disclosed in Japanese Patent Application Laid-open No. 2003-324574 adds a character string pre-set or arbitrarily input in an e-mail attached with image data of a paper document as an e-mail title, text, or comment and transmits the e-mail. In the electronic mail system, an e-mail distribution functional unit in the server generates an e-mail attached with image data obtained by reading the paper document by an electronic-data generation functional unit in the scanner as an attachment file. A character string corresponding to an address specified as a transmission destination of the image data is read from a character-string storage functional unit that stores the character strings such as an e-mail title, text, and comment together with an application specification for each transmission destination of the e-mail. An e-mail including the e-mail title, text, and comment is generated according to the application specification of the character string, and transmitted to the specified address.

"Network scanner device" disclosed in Japanese Patent Application Laid-open No. 2004-222141 takes a security measure at the time of transmitting image data via a network and a security measure for the image data in a state with excellent usability. The network scanner device stores in a storage unit destination information including a user name, a password, distribution destination information, and other referable destination IDs that can be used by a user at the destination, as a destination management table. User authentication is performed based on a set of the user name and the password, and only a user with user authentication being successful is permitted to use the network scanner device. Referable destination addresses are displayed on a display unit, and image data of the document read by an image reader is stored in the storage unit. At this time, a document management table in which a destination appropriately selected from the referable destination addresses displayed on the display unit is designated as a referable destination of the image data is generated, and stored in the storage unit, thereby protecting confidentiality of the destination and the document.

"Document distribution processing apparatus" disclosed in Japanese Patent Application Laid-open No. 2005-208934 can easily perform necessary image processing automatically, when a document is read and distributed. An optical color recognition (OCR) form sheet is arranged at a top page of an input document. Code data corresponding to an image processing menu written in the OCR form sheet and image processing position data specifying an image processing range are recognized and extracted from document data obtained by reading a document by a scanner. Image processing corresponding to the extracted code data is performed for a range determined by the image processing position data. After specified image processing is performed, the document is distributed to a predetermined distribution destination.

However, the conventional distribution management systems have following problems. For example, because the distribution processing menu required for distribution needs to be registered in the distribution server by the system manager in advance, the system manager can be overloaded. Particularly, when the distribution processing menu matched with the purpose of a user is not registered in the distribution server, the system manager needs to additionally register a new distribution processing menu in the server on a case-by-case basis, and thus the system manager can be overloaded on a steady basis.

SUMMARY OF THE INVENTION

It is an object of the present invention to at least partially solve the problems in the conventional technology.

According to one aspect of the present invention, there is provided an image processing apparatus including a process-flow calling unit that calls existing flow definition data defining a process flow of image data from a distribution management apparatus connected via a network; a list display unit that displays thereon a list of flow definition data called by the process-flow calling unit; and a process-flow generating unit that generates new flow definition data, when desired flow definition data does not exist in the list displayed on the list display unit.

Furthermore, according to another aspect of the present invention, there is provided a distribution management method for an image processing apparatus connected to a distribution management apparatus via a network. The distribution management method includes generating new flow definition data defining a process flow of image data by using an operation panel of the image processing apparatus; distribution requesting including transmitting the new flow definition data generated at the generating and image data obtained by reading an original image to the distribution management apparatus, and requesting a distribution of the image data to the distribution management apparatus; and causing the distribution management apparatus to distribute the image data based on the image data and the new flow definition data transmitted at the transmitting.

Moreover, according to still another aspect of the present invention, there is provided a computer-readable recording medium that stores therein a computer program for distributing image data in an image processing apparatus connected to a distribution management apparatus via a network. The computer program causes a computer to execute generating new flow definition data defining a process flow of image data by using an operation panel of the image processing apparatus; distribution requesting including transmitting the new flow definition data generated at the generating and image data obtained by reading an original image to the distribution management apparatus, and requesting a distribution of the image data to the distribution management apparatus; and causing the distribution management apparatus to distribute the image data based on the image data and the new flow definition data transmitted at the transmitting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments an image processing apparatus, a distribution management system, a distribution management method, a distribution management program, and a recording medium according to the present invention will be explained below in detail with reference to the accompanying drawings. In the following embodiments, examples are explained in which the image processing apparatus, the distribution management system, the distribution management method, the distribution management program, and the recording medium according to the present invention are applied to a digital multifunction product (MFP) capable of performing a distribution process of image data scanned thereby using a newly generated distribution processing menu, a distribution server, a distribution management system, a distribution management method, a distribution management program, and a recording medium. However, the image processing apparatus, the distribution management system, the distribution management method, the distribution management program, and the recording medium according to the present invention are not limited thereto, and can be applied to any apparatus or system that controls to perform a distribution process with respect to image data.

In the following embodiments, an example of an MFP having a printer function, a scanner function, a copy function, and a fax function incorporated therein in one housing is explained as the image processing apparatus that inputs image data. However, the present invention is not limited thereto, and can be applied to any of a scanner, a fax machine, and a copying machine, as far as image data can be input.

Figure 1:
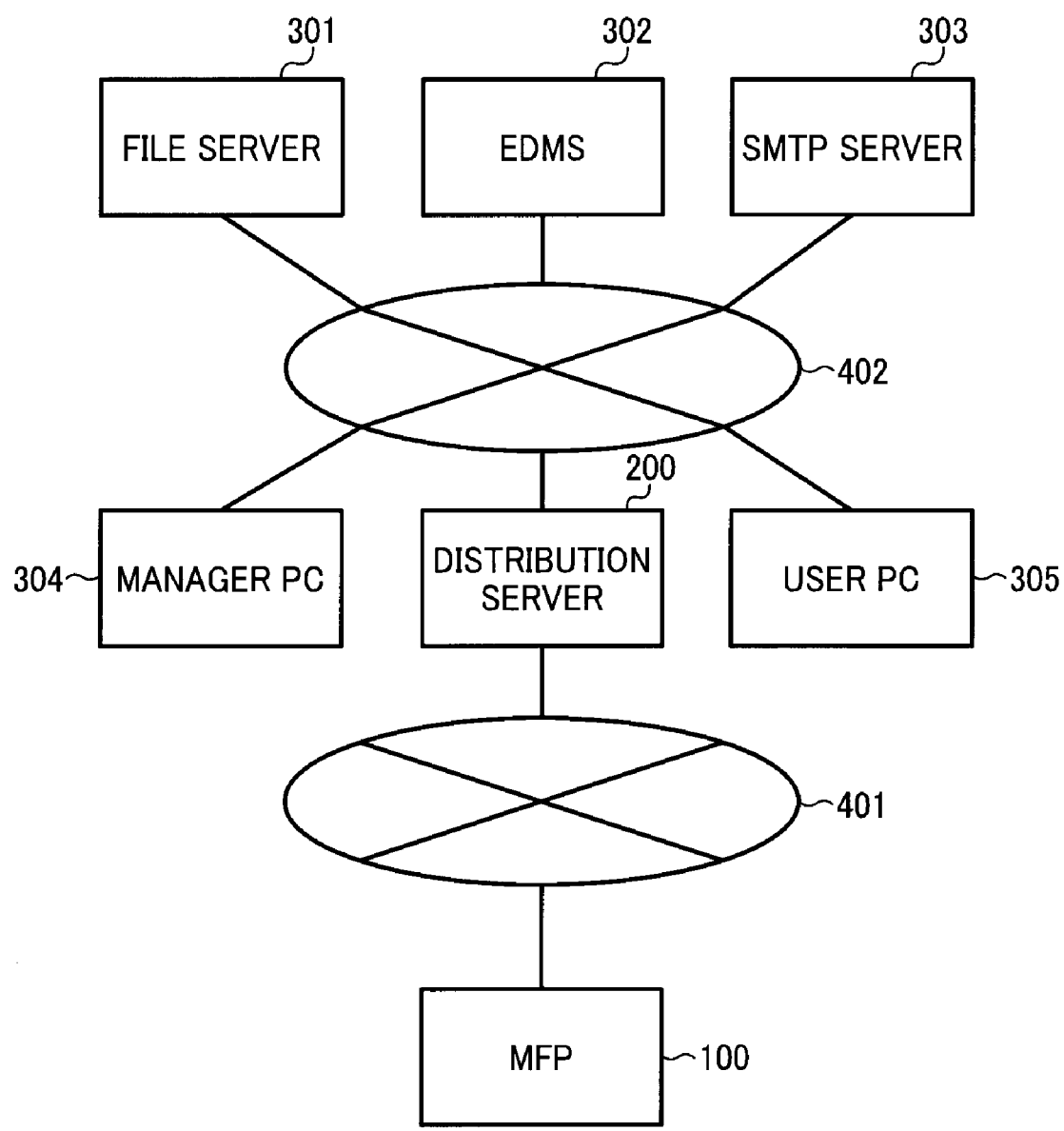
FIG. 1 is a schematic diagram for explaining a network configuration of a distribution management system according to a first embodiment of the present invention.

FIG. 1 is a schematic diagram for explaining a network configuration of a distribution management system according to a first embodiment of the present invention. As shown in FIG. 1, the distribution management system according to the first embodiment includes a distribution server 200 connected to the Internet 402, a file server 301, an enterprise document management system (EDMS) 302, a simple mail transfer protocol (SMTP) server 303, a manager personal computer (PC) 304, and a user PC 305. The distribution server 200 mainly includes an MFP 100 connected to a network 401 such as a local access network (LAN) or the Internet.

The scanner function, the copy function, the printer function, and the fax function are incorporated in the MFP 100 in one housing. The MFP 100 scans a paper medium or the like by the scanner function to generate image data, and transmits the generated image data to the distribution server 200. Details of the MFP 100 are described later.

The distribution server 200 is a computer such as a workstation that receives the image data scanned by the MFP 100 and performs various processes and the distribution process according to flow definition data described later.

The file server 301 is a computer that accumulates files to be shared and managed on the Internet 402, the EDMS 302 is a so-called document management system, and the SMTP server 303 transmits e-mails conforming to the SMTP, which is an e-mail transfer protocol. The file server 301, the EDMS 302, and the SMTP server 303 are accessed by the distribution process performed by the distribution server 200.

Figure 2:
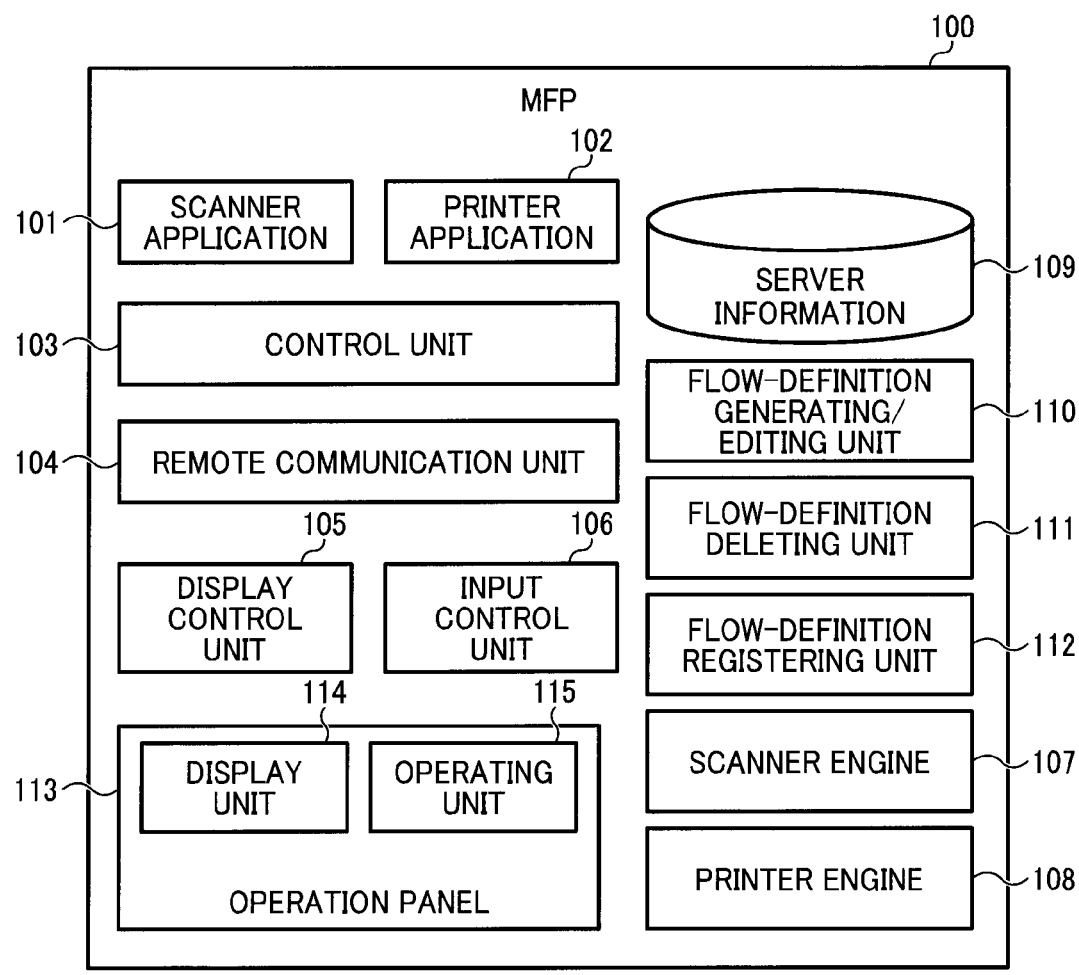
FIG. 2 is a block diagram of a functional configuration of a digital multifunction product.

Details of the MFP 100 are explained next. FIG. 2 is a block diagram of a functional configuration of the MFP 100. The MFP 100 according to the first embodiment includes, as shown in FIG. 2, a scanner application 101, a printer application 102, a control unit 103 as a process-flow calling unit, a process-function obtaining unit, and a usage-authorization determining unit, a remote communication unit as an authorization-data obtaining unit, and a registration-request transmitting unit, a display control unit 105, an input control unit 106, a scanner engine 107, a printer engine 108, server information 109, a flow-definition generating/editing unit 110 as a process-flow generating unit, a flow generating unit, and a flow editing unit, a flow-definition deleting unit 111 as a flow deleting unit, a flow-definition registering unit 112 as a flow registering unit, and an operation panel 113. The operation panel 113 also includes a display unit 114 as a process-function display unit and a flow display unit, and an operating unit 115 as a process-function selecting unit, a registration selecting unit, and a selecting unit.

The flow-definition generating/editing unit 110 newly generates flow definition data (distribution processing menu) defining a flow of various processes with respect to the image data scanned and input by the MFP 100 by a user or performs an editing process by using existing or newly generated flow definition data. When newly generating the flow definition data or performing the editing process, the user instructs the display unit 114 of the operation panel 113 to display a generation or editing screen, to input data required for the generation or editing process by using the operating unit 115, so that the flow-definition generating/editing unit 110 newly generates or edits the flow definition data.

The flow definition data indicates a flow of one or a plurality of processes to be performed with respect to the image data scanned and input by the MFP 100. These processes include an output process, which is a distribution process of the image data, and an intermediate process performed on a previous stage of the output process. In the flow definition data, a series of process flows sequentially combining one or a plurality of intermediate processes and one or a plurality of output processes performed by the distribution server 200, or a series of process flows sequentially combining one or a plurality of output process flows are described. The flow definition data can be defined to perform these series of process flows.

The output process includes the distribution process to the MFP 100, the Internet 402, or a folder on an arbitrary PC on the network 401, the distribution process to the file server 301 or a WEB server, and an e-mail transmission process (SMTP distribution process) for transmitting the image data as an attached document by the e-mail (at this time, the SMTP server 303 is used). As the output process, there is a Web-based Distributed Authoring and Versioning (WebDAV) distribution process of uploading the image data to a WebDAV folder or a file transfer protocol (FTP) distribution process of uploading the image data to an FTP folder.

The intermediate process includes an image format conversion process of converting a file format of the image data, an OCR extraction process of extracting a text from an image file, a metadata operation process of operating metadata (property) of the image, a section (page) operation process of sorting the pages of the image file, and an archive generation process of archiving a plurality of image files to combine the image files into one file.

The flow-definition deleting unit 111 performs the distribution process by using the flow definition data newly generated or edited by the flow-definition generating/editing unit 110 of the MFP 100, and deletes the flow definition data without registering it.

The flow-definition registering unit 112 registers the flow definition data newly generated or edited by the flow-definition generating/editing unit 110 of the MFP 100 in the distribution server 200. When all pieces of flow definition data constructed by the user of the MFP 100 are registered, a memory for storing the flow of the distribution server 200 becomes insufficient. Therefore, after the distribution process is performed by using the newly generated or edited flow definition data, the flow definition data is essentially deleted by the flow-definition deleting unit 111. However, the data, which can be reused, can be exceptionally registered by using the flow-definition registering unit 112.

The server information 109 is a database registering an IP address or the like of the distribution server 200, and is stored on the recording medium such as a hard disk drive (HDD) or a memory.

The scanner engine 107 is hardware that executes a scanning operation, and the printer engine 108 is hardware that executes a printing operation. The operation panel 113 is hardware that allows the user of the MFP 100 to display various screens to perform operation input. The operation panel 113 includes the display unit 114 capable of displaying various screens and the operation unit 115 including a start button, a stop button, a copy button, a scanning button, and a selection button for performing various selections.

Upon reception of a request from an application such as the scanner application 101 or the printer application 102, the control unit 103 controls the scanner engine 107, the printer engine 108, the HDD, the memory, and the like. Specifically, the control unit 103 calls the existing flow definition data in the distribution server 200 as the distribution management apparatus from a remote communication unit 104 via the network 401 (process-flow calling unit), and obtains a selectable process-function from the distribution server 200 at the time of newly generating the flow definition data (process-function obtaining unit).

The remote communication unit 104 controls transfer of various pieces of data with respect to the distribution server 200. Specifically, the remote communication unit 104 registers the flow definition data transmitted to the distribution server 200 together with the image data in the distribution server 200 (flow registering unit). The remote communication unit 104 obtains from the distribution server 200 authorization data or the like for determining, for example, whether the user has an authorization to delete the flow definition data, as the authorization data of the user (authorization-data obtaining unit). The remote communication unit 104 transmits a registration request for requesting registration of the flow definition data to a manager of the distribution server 200, at the time of performing the distribution process by using the newly generated or edited flow definition data (registration-request transmitting unit).

The display control unit 105 controls the display unit 114 so that various screens, a software keyboard screen, and the like can be touched for input. Specifically, the display control unit 105 controls such that an establishing tool of the flow definition data received from the distribution server 200 via the remote communication unit 104 is displayed on the display unit 114. Accordingly, because the establishing tool of the flow definition data provided for the manager PC 304 that manages the distribution server 200 can be displayed on the display unit 114 of the operation panel 113 of the MFP 100, the user of the MFP 100 can establish desired flow definition data by touch input on the display unit 114 of the operation panel 113 or by using the operating unit 115 or the like.

The input control unit 106 receives the touch input or software key input from the display unit or the operation input from the operating unit 115 to perform the input control. Specifically, by inputting an event by the touch input with respect to the display unit 114 or pressing of various buttons in the operating unit 115, the touch input or pressing of the button is detected. Such detection is notified to the scanner application 101 or the flow-definition generating/editing unit 110.

The scanner application 101 sets a scanning condition or performs a scanning process according to an instruction from the operating unit 115 by the user (the scanning button or the like). Specifically, the scanner application 101 makes a scanning request to the control unit 103 to operate the scanner engine 107, and scans a document. The scanner application 101 inputs the scanned image data of the document. At the time of starting the scanning process, that is, when the input control unit 106 detects that the user presses the scanning button, the scanner application 101 instructs the distribution server 200 to transmit a list display screen via the remote communication unit 104 to select the existing flow definition data.

Figure 7:
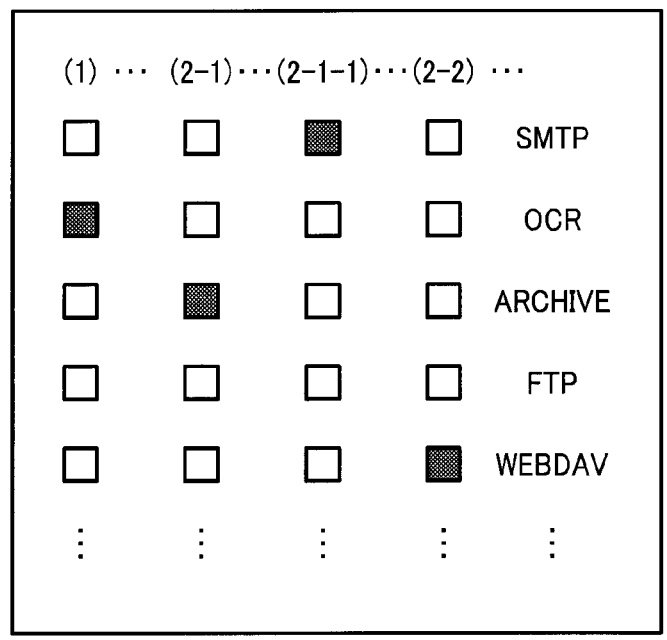
FIG. 7 is an example in which new flow definition data is established by checking a predetermined mark sense sheet and reading the sheet by a scanner.
Figure 8:
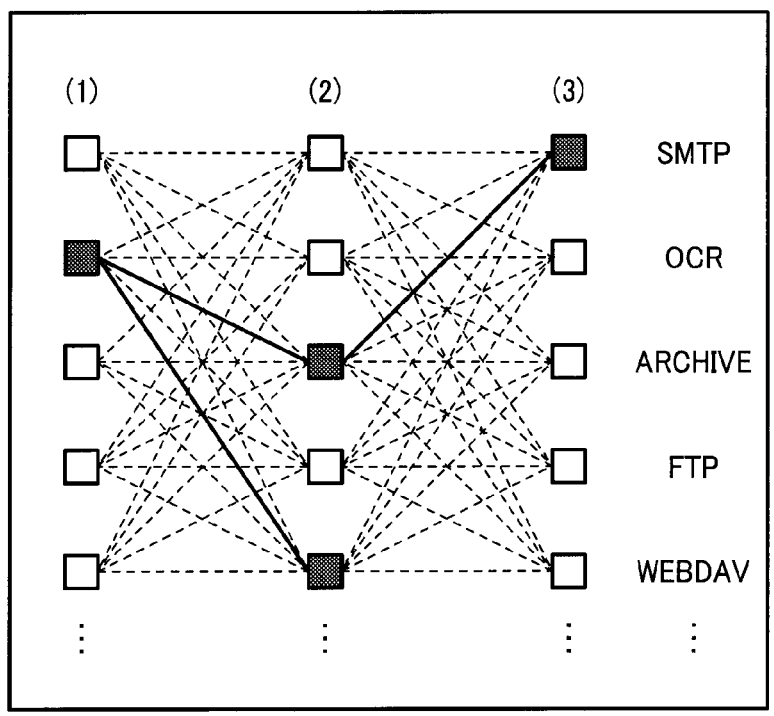
FIG. 8 is an example in which new flow definition data is established by checking another mark sense sheet and reading the sheet by the scanner.

The printer application 102 performs a printing process in the MFP 100. Specifically, the printer application 102 makes a print request to the control unit 103 to operate the printer engine 108. The printer application 102 has a function of printing an empty mark sense sheet as shown in FIGS. 7 and 8 described later. Specifically, the printer application 102 prints and outputs a list of functions usable in the distribution server 200 and the empty mark sense sheet in which check boxes corresponding to the list are printed. The user of the MFP 100 can establish desired flow definition data only by marking over the check box on the empty mark sense sheet and scanning and reading it.

In FIG. 2, only the scanner application 101 and the printer application 102 are shown as the application in FIG. 2; however, a copy application for performing a copying process and a fax application for performing a fax transfer process operate as other applications.

Figure 3:
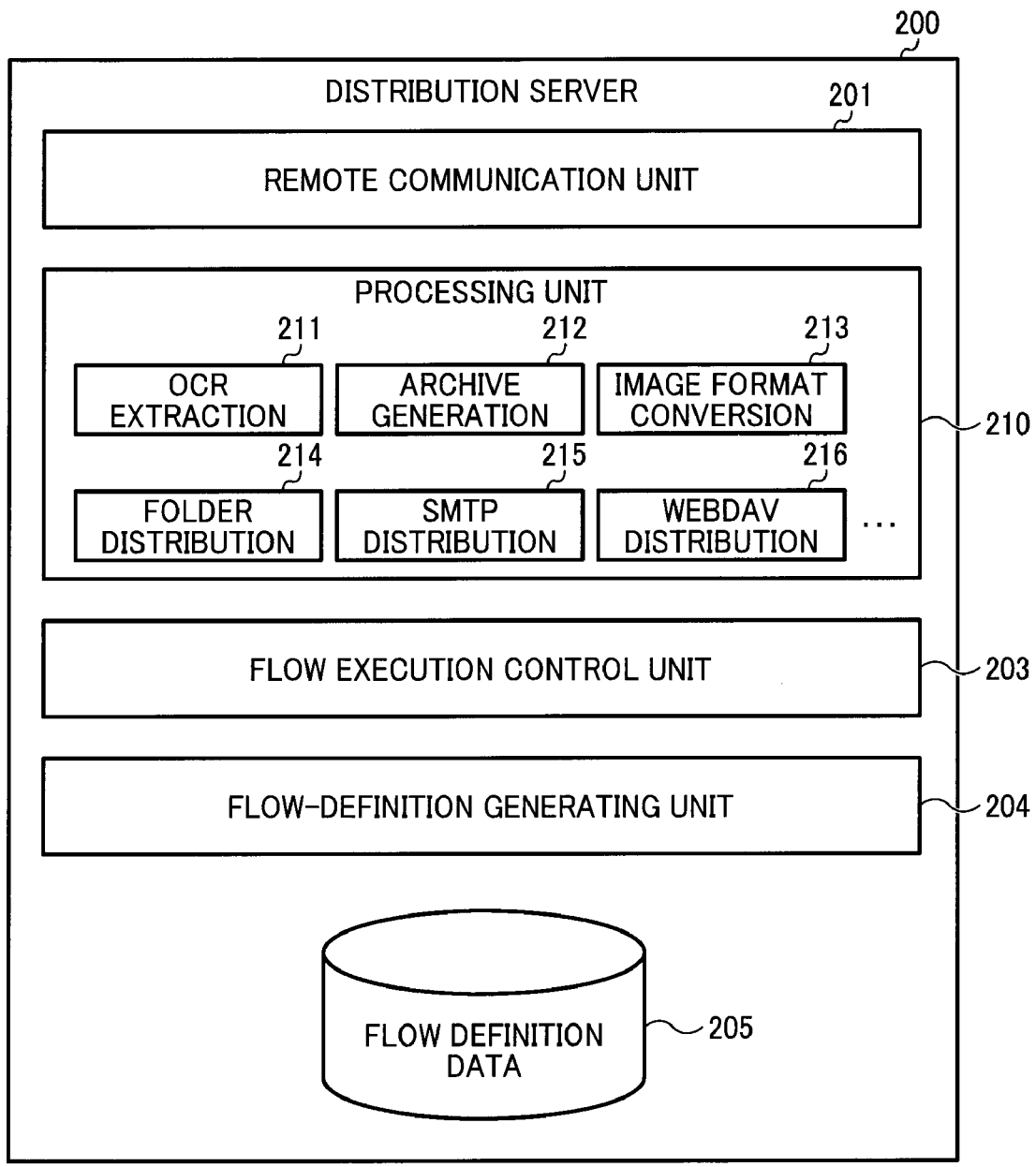
FIG. 3 is a block diagram of a functional configuration of a distribution server.

Details of the distribution server 200 are explained next. FIG. 3 is a block diagram of a functional configuration of the distribution server 200. As shown in FIG. 3, the distribution server 200 mainly includes a remote communication unit 201, a processing unit 210, a flow execution control unit 203, a flow-definition generating unit 204, and flow definition data 205 as a flow storage unit (hard disk drive (HDD)) that registers the flow definition data.

The flow definition data 205 is scanned and input by the MFP 100, and defines the flow of various processes with respect to the image data received from the MFP 100. The processing unit 210 includes various function programs usable at the time of generating the flow definition data as described later. The user can generate new flow definition data by selecting a desired function from a plurality of function programs. The flow definition data 205 is stored on a recording medium (flow storage unit or the like) such as an HDD. Details of the flow definition data 205 will be explained later.

The remote communication unit 201 controls request of the existing flow definition data from the MFP 100, reception of the image data and the newly generated or edited flow definition data, and transmission of the process-function data to the MFP 100. The remote communication unit 201 also controls transfer of various pieces of data at the time of performing the various processes.

The processing unit 210 executes various function programs defined in the flow definition data 205, and includes OCR extraction 211 for extracting a text from the scanned image data, archive generation 212 for compressing the image data, image format conversion 213 for converting the file format of the image data, folder distribution 214 for distributing the image data to a folder of the MFP 100 or an arbitrary PC on the network 401 or the Internet 402, e-mail transmission (SMTP distribution 215) for transmitting the image data as an attached document by e-mail, and WebDAV distribution 216 for uploading the image data to a WebDAV folder.

The flow execution control unit 203 reads the flow definition data 205 from the HDD and controls the execution of the various processes defined by the flow definition data 205 by the processing unit 210. The flow execution control unit 203 also controls the newly generated or edited flow definition data received from the MFP 100 by the remote communication unit 201 and execution of various processes based on the image data.

The flow-definition generating unit 204 generates or edits the flow definition data 205 according to an instruction of the system manager such as an administrator of the distribution server 200 and stores the generated or edited flow definition data 205 in the HDD.

Figures 4, 5:
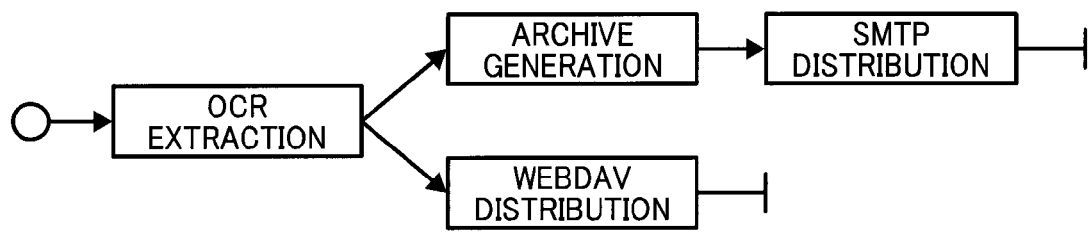
FIG. 4 is a schematic diagram for explaining an example of a process flow defined in flow definition data.
FIG. 5 is a schematic diagram for explaining a content described in the flow definition data.

FIG. 4 is a schematic diagram for explaining an example of the process flow defined in the flow definition data 205. In FIG. 4, an example of the flow definition data associated with a distribution process of the scanned image data is shown. The flow definition data 205 shows that a flow for sequentially performing an OCR extraction process (OCR extraction) for extracting a text from the scanned image data, an archive generation process of compressing the image data (archive generation), and an e-mail process of transmitting the archived image data by an e-mail (SMTP distribution 215), and a flow for uploading the image data to a WebDAV folder (WebDAV distribution) are executed in parallel.

The flow definition data 205 is described in an extensible markup language (XML) format. FIG. 5 is a schematic diagram for explaining a content described in the flow definition data 205. The flow definition data 205 in FIG. 5 defines a distribution flow shown in FIG. 4.

When the flow definition data 205 is newly generated, a plurality of function programs (211 to 216 and the like) in the processing unit 210 is displayed on the display unit 114 of the operation panel 113 to select a desired function. For example, the intermediate process includes an OCR extraction function, an image-format conversion function, a metadata operation function, a section operation function, an archive generation function, and the like. The output process includes an SMTP distribution function, a folder distribution function, a WebDAV distribution function, an FTP distribution function, and the like.

When the scanning operation is started in the MFP 100, the existing flow definition data is called from the distribution server 200 and list-displayed on the display unit 114 of the operation panel 113. However, when there is no flow definition data desired by the user in the list, generation of new flow definition data is instructed. Upon reception of the generation instruction of the new flow definition data from the user, the MFP 100 obtains various selectable function programs from the processing unit 210 in the distribution server 200.

New generation of the flow definition data by the flow-definition generating/editing unit 110 and editing of the existing flow definition data are explained next. The flow-definition generating/editing unit 110 displays a generation screen of the flow definition data on the display unit 114 of the operation panel 113 in the MFP 100. The user of the MFP 100 uses the generation screen of the flow definition data, and performs the operation input from the operation unit 115 to establish the definition process in the flow definition data 205 by performing operation input from the operating unit 115. Accordingly, the flow-definition generating/editing unit 110 generates new flow definition data in the XML format based on the information created on the generation screen of the flow definition data.

Figure 6:
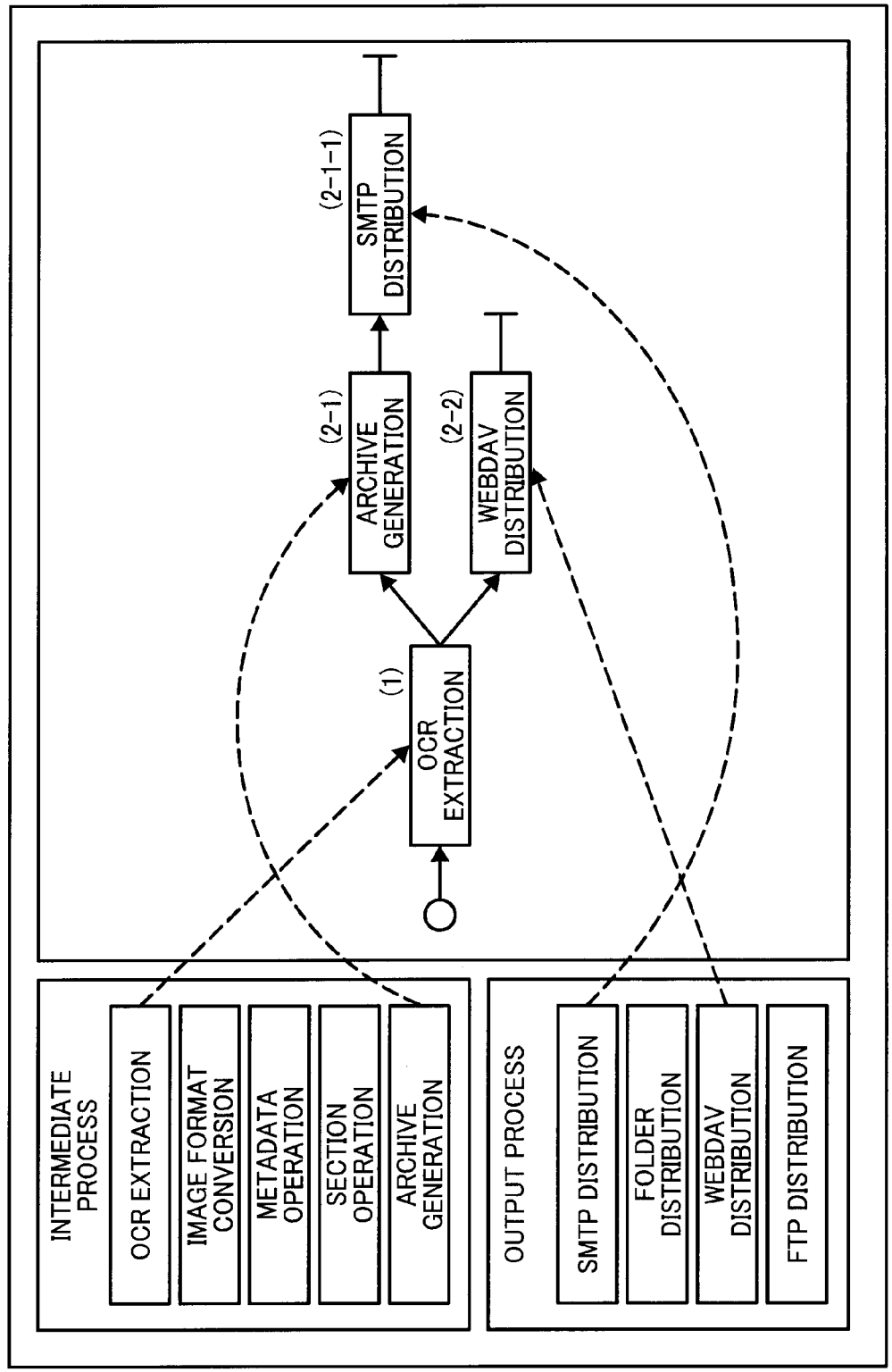
FIG. 6 is schematic diagram of an example of a screen for generating new flow definition data from an operation panel by a user of the digital multifunction product.

FIG. 6 is an example of a screen for generating new flow definition data from the operation panel by the user of the MFP. FIG. 6 depicts a case that the flow definition data defining the process flow of the image data shown in FIGS. 4 and 5 is generated.

As shown in FIG. 6, a list of respective processing buttons of the intermediate process and the output process is displayed in an area on the left on the generation screen of the flow definition data. The user of the MFP 100 selects the button of the process desired to establish a flow from the list, in order of parent→child (branch)→grandchild, for example, by adding (1), (2-1), (2-2), (2-1-1), and arranges the selected buttons at desired positions in an area on the right by a drag-and-drop operation. In the generation screen shown in FIG. 6, circle in the area on the right indicates the scanning process, and it is defined that the process is performed according to the order of buttons with arrow.

In this manner, after the user of the MFP 100 establishes the new flow definition data on the generation screen of the flow definition data, when the user instructs execution, the flow-definition generating/editing unit 110 analyses the processing buttons arranged in the right part on the flow-definition-data generation screen and the arrangement order thereof based on a position coordinate or the like on the screen. The flow-definition generating/editing unit 110 also determines a processing ID corresponding to the process of each button and generates the flow definition data in the XML format as shown in FIG. 5, taking the processing order into consideration. The newly generated flow definition data can be registered in the HDD for the flow definition data 205 in the distribution server 200, or can be used once and thrown away without registering it (can be discarded after use).

In addition to newly generating the flow definition data, an editing process of adding partial correction using the existing flow definition data can be performed. For example, the flow-definition generating/editing unit 110 can easily generate the flow definition data in the XML format by assuming that the flow definition data shown in FIG. 6 is called, and replacing the functions of the intermediate process and the output process therein by the drag-and-drop operation to establish new flow definition data different from the existing flow definition data, and instructing execution thereof.

FIG. 7 is an example in which new flow definition data is established by checking a predetermined mark sense sheet and reading the sheet by the scanner. In the mark sense sheet in FIG. 7, for example, the list of the intermediate process and the output process is displayed in a vertical direction, check columns indicating a processing order or a branching position by adding a branch number such as parent→child→grandchild shown in FIG. 6 are arranged in a horizontal direction, and the check columns are marked over in order of processing, thereby completing the mark sense sheet. The scanner application 101 of the MFP 100 shown in FIG. 2 makes a scanning request of the completed mark sense sheet to the control unit 103, and operates the scanner engine 107 to input the scanned image data to the flow-definition generating/editing unit 110. The flow-definition generating/editing unit 110 can generate the flow definition data in the XML format as shown in FIG. 5 (flow definition data the same as that in the right part on the generation screen in FIG. 6) by analyzing the arrangement order of the flow definition data based on the input processing list of the image data and the marking position.

FIG. 8 is an example in which new flow definition data is established by checking another mark sense sheet and reading the mark sense sheet by the scanner. The mark sense sheet in FIG. 8 is the same as that in FIG. 7 in that the list of the intermediate process and the output process is displayed in the vertical direction, however, the check columns added with numbers of (1), (2), and (3) corresponding to parent→child→grandchild are arranged in the horizontal direction. Because connection of the flow is uncertain only by these numbers, a line connecting the process flows can be used. Accordingly, branching and mutual connection of the flows can be expressed only by the mark sense sheet, and the flow definition data in the XML format shown in FIG. 5 can be generated only by scanning the mark sense sheet (flow definition data the same as that in the right part on the generation screen in FIG. 6).

Figure 9:
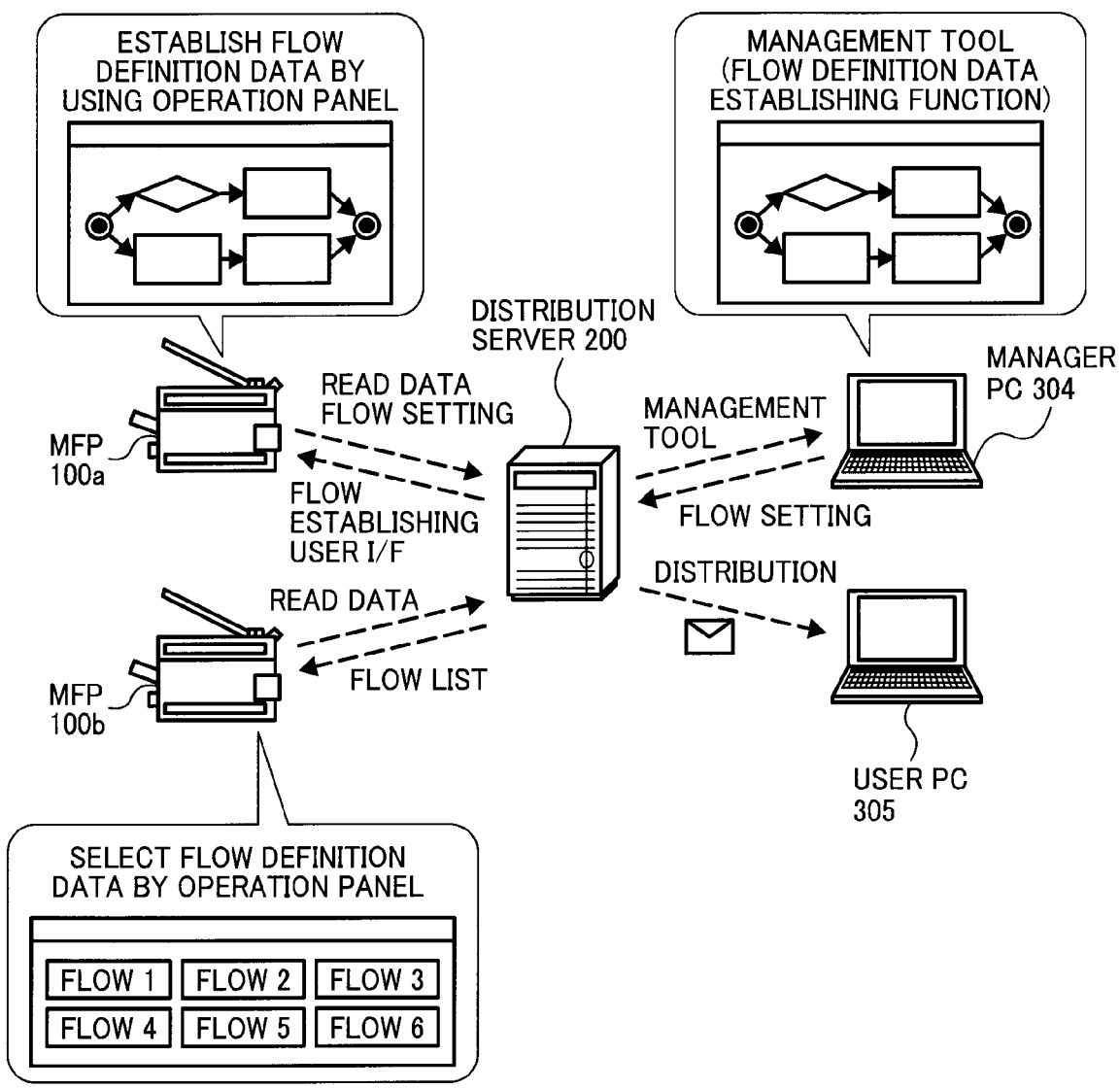
FIG. 9 is a network configuration diagram for explaining establishment of new flow definition data in the distribution management system according to the first embodiment.
Figure 10:
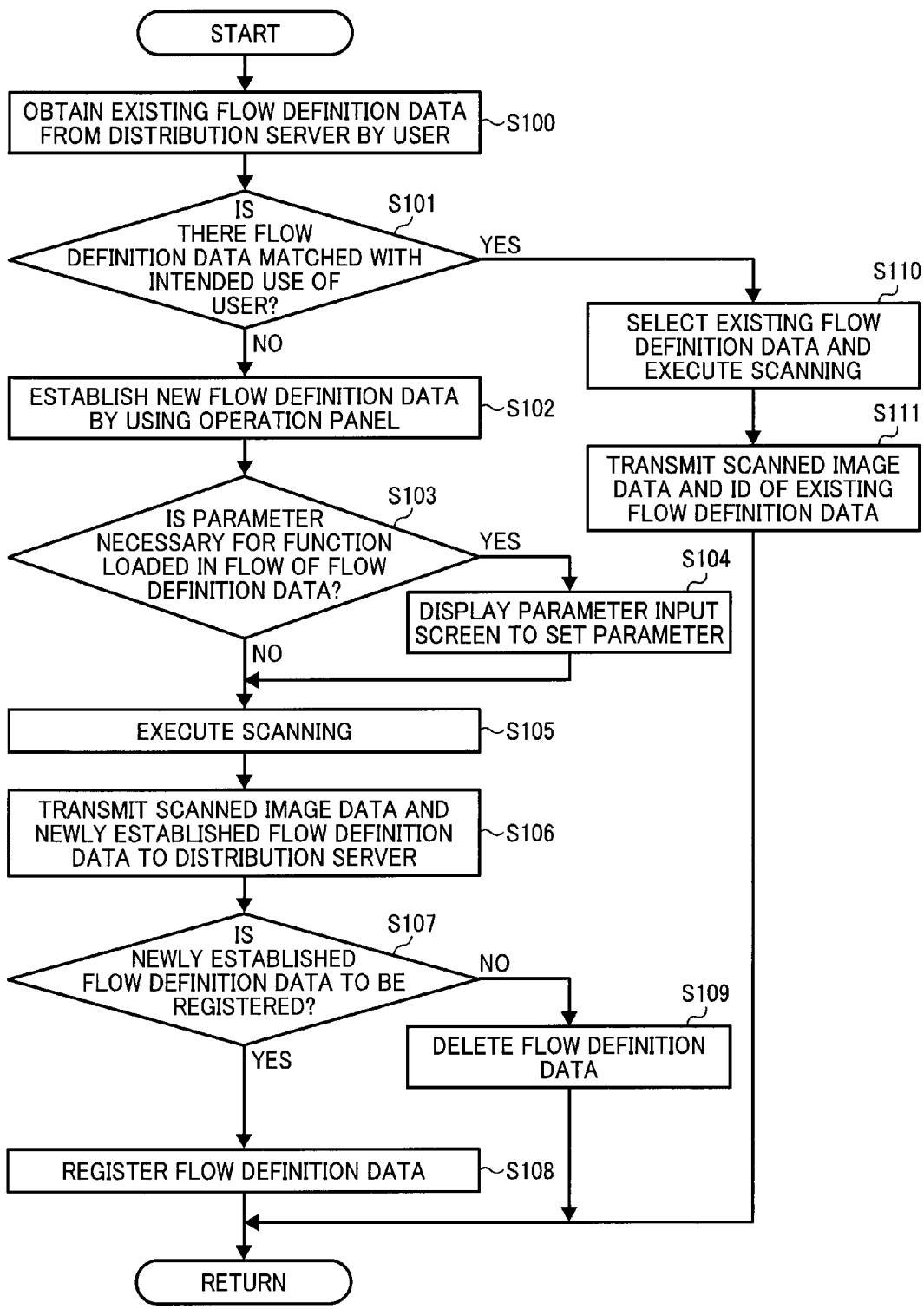
FIG. 10 is a flowchart of a process on a digital multifunction product side of the distribution management system.
Figure 11:
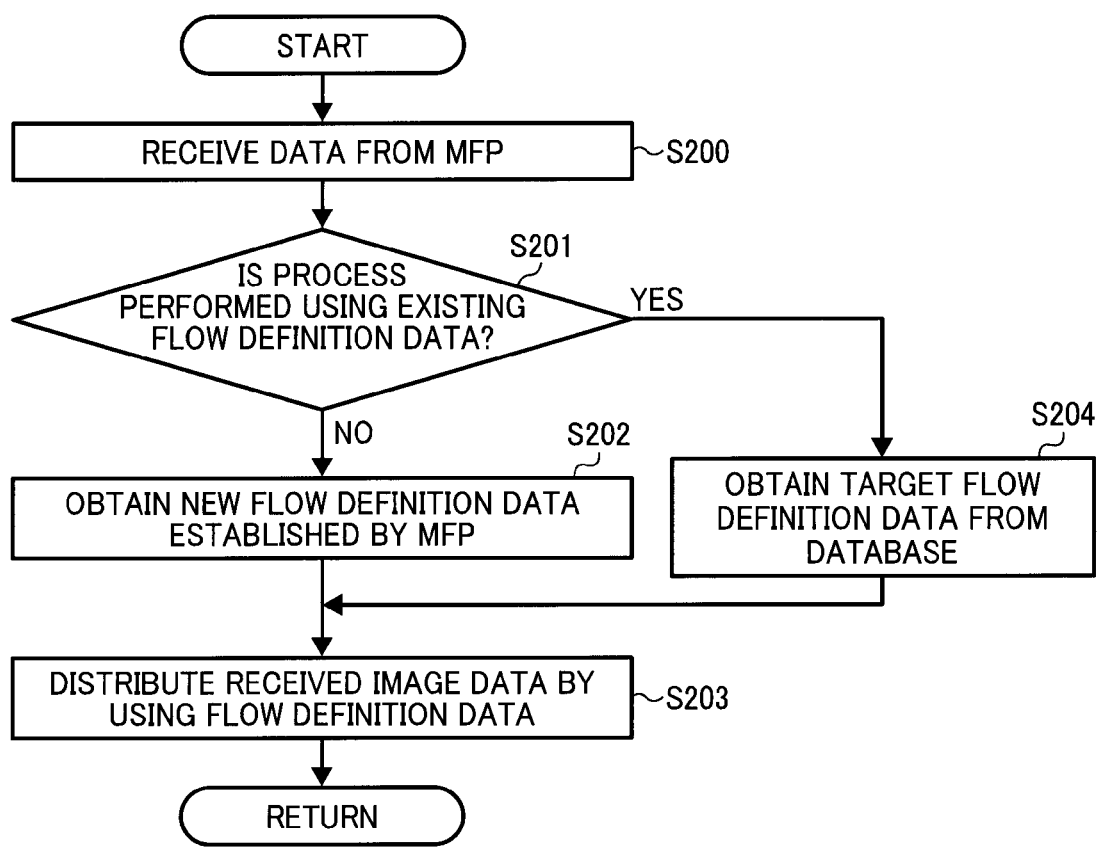
FIG. 11 is a flowchart of a process on a distribution server side of the distribution management system.

An establishing process of the new flow definition data by the distribution management system according to the first embodiment is explained next. FIG. 9 is a network configuration diagram for explaining establishment of the new flow definition data in the distribution management system according to the first embodiment, FIG. 10 is a flowchart of a process on the MFP side of the distribution management system, and FIG. 11 is a flowchart of a process on a distribution server side of the distribution management system.

In FIG. 9, there are MFPs 100*a* and 100*b* as the image processing apparatuses that scan a document image to read the image data, select the existing flow definition data for performing the distribution process with respect to the read image data in accordance with an intended use, newly established the flow definition data when the desired flow definition data is not registered, select whether the newly established flow definition data is to be registered in the distribution server 200, or delete the flow definition data. The distribution server 200 connected to the MFPs 100*a* and 100*b* via the network performs the distribution process of the image data based on the image data from the MFPs 100*a* and 100*b* and the flow definition data. The distribution server 200 is connected to the manager PC 304 or the user PC 305 via the Internet or the like. The system manager establishes the flow definition data required for the distribution process of the image data or the like by the manager PC 304 and registers the flow definition data in the distribution server 200. The user of the image data can use the image data scanned by the MFPs by distributing the image data to the user PC 305 by the distribution server 200.

The MFP 100*b* in FIG. 9 calls the existing flow definition data registered in the distribution server 200 to list-display the flow definition data on the display unit 114 of the operation panel 113 shown in FIG. 2. In the MFP 100*b* shown in FIG. 9, the existing flows 1 to 6 are displayed on the operation panel and the flow definition data corresponding to the intended use of the user is selected therefrom by the operating unit 115, and the distribution process is performed by using the selected flow definition data. This process is performed in the conventional distribution management system.

The characteristic of the present invention is that when there is no flow definition data desired by the user in the existing flow definition data list-displayed on the display unit 114, the user can establish desired new flow definition data by using the MFP 100*a* in FIG. 9.

In the first embodiment, an establishment screen the same as the management tool having an establishing function of the flow definition data provided for the manager PC 304 by the distribution server 200 in FIG. 9 is displayed on the operation panel 113 (see FIG. 2) of the MFP 100*a*. Specifically, the display unit 114 of the operation panel 113 in the latest MFP becomes increasingly sophisticated and has the display function equivalent to that of a standard web browser. Accordingly, if the management tool for the manager PC 304 is distributed from the distribution server 200 as a web application, the flow establishing screen the same as the management tool can be displayed on the display unit 114 of the operation panel in the MFP.

To facilitate the establishing operation of the flow definition data using the operation panel in the MFP 100*a*, the existing flow definition data registered beforehand in the HDD of the distribution server 200 is called (the control unit 103 calls the existing flow definition data 205 in the distribution server 200 from the remote communication unit 104 via the network 401) to establish new flow definition data by editing the existing flow definition data.

When the flow definition data is newly established, the control unit 103 in FIG. 2 obtains various function programs (211 to 216 . . . ) selectable from the processing unit 210 in the distribution server 200, from the remote communication unit 104 via the network 401. The obtained function programs (211 to 216 . . . ) are displayed by the display control unit 105 as a button list of the intermediate process or the output process in the left part on the generation screen shown in FIG. 6. The user of the MFP 100 who establishes the flow definition data sequentially selects buttons of the process, for which it is desired to establish the flow, from the list and arranges the buttons at desired positions in the right part by the drag-and-drop operation.

The flow-definition generating/editing unit 110 analyzes the buttons of the process arranged in the right part on the flow-definition-data generation screen and the arrangement order thereof based on the position coordinate on the screen or the like, thereby enabling to generate new flow definition data in the XML format as shown in FIG. 5, taking the processing order into consideration. Thus, only the system manager has heretofore established the flow definition data by using the management tool of the manager PC 304, whereas in the present invention, the user of the MFP 100*a* can also newly establish desired flow definition data. Therefore, the system manager can be free from the operation for establishing the flow definition data associated with the distribution process according to various applications in advance, and the user of the MFP can establish the flow definition data and use it, even if there is no desired flow definition data.

Subsequently, the process flow on the MFP side and the distribution server side in the distribution management system is explained with reference to flowcharts in FIGS. 10 and 11. At the time of performing the distribution process of read image data according to the intended use, the user of the MFP obtains the list of the existing flow definition data 205 from the HDD in the distribution server 200 (Step S100). Because the list of the obtained existing flow definition data 205 is displayed on the display unit 114 of the operation panel 113 in the MFP 100 shown in FIG. 2, the user determines whether the flow definition data matched with the intended use is in the list (Step S101).

When there is no flow definition data matched with the intended use in the existing flow definition data 205, the user of the MFP establishes new flow definition data by using the flow-definition generating/editing unit 110 (Step S102). The user determines whether parameter setting is required for a function in the flow of the established flow definition data (for example, OCR extraction function, SMTP distribution function, or the like) (Step S103). When parameter setting is required, a parameter input screen is displayed and set (Step S104). When parameter setting is not required or after the setting or the parameter is not required at Step S103 or after the parameter is set at Step S104, scanning of the image data is executed (Step S105). Specifically, the scanner application 101 in the MFP 100 makes a scanning request to the control unit 103, and operates the scanner engine 107 to scan the document.

The image data scanned by the MFP 100 and the newly established flow definition data are transmitted to the distribution server 200 by the remote communication unit 104 (Step S106), and the distribution process is performed according to the flowchart on the distribution server 200 side in FIG. 10 described later.

The flow definition data newly established by the MFP 100 does not always need to be registered and saved, because there is the flow definition data established on the spot. It is determined whether to register the established flow definition data at Step S107. The flow definition data, which can be reused, is registered in the distribution server 200 to save time for establishing the data each time (Step S108). When the established flow definition data is an exceptional one and will not be reused, the established flow definition data is deleted without registering it (Step S109).

Returning to Step S101, when there is the flow definition data matched with the intended use of the user in the list of the existing flow definition data 205 obtained from the distribution server 200, the user touches a touch panel of the display unit 114 of the operation panel 113 or the user selects desired flow definition data using the operating unit 115, to execute scanning (Step S110).

When the existing flow definition data in the distribution server 200 is used, it is not necessary to transfer the flow definition data. Accordingly, the ID of the flow definition data and the scanned image data need only to be transmitted from the MFP 100 to the distribution server 200 (Step S111).

On the other hand, in a flowchart on the distribution server 200 side shown in FIG. 11, the data transmitted from the MFP 100 is received at Step S106 or S111 in FIG. 10 (Step S200). It is then determined whether to process the received data according to the existing flow definition data (Step S201). When the distribution process is performed by using the flow definition data newly established by the MFP 100, the established flow definition data is obtained (Step S202), and desired distribution process can be performed by using the received image data (Step S203).

At Step S201, when the process is performed by using the existing flow definition data, as shown at Step S108 in FIG. 9, the ID of the flow definition data is transmitted. Therefore, the target flow definition data 205 is obtained from the database registered in the HDD based on the ID received by the distribution server 200 (Step S204). Also in this case, the distribution process of the received image data is performed by using the obtained flow definition data (Step S203).

Thus, in the distribution management system according to the first embodiment, when the user of the MFP 100 performs a desired distribution process of the scanned image data, the existing flow definition data is called from the distribution server 200 and list-displayed. When there is the desired flow definition data therein, the image data is distributed by using the flow definition data. When there is no desired flow definition data in the existing flow definition data, the desired flow definition data can be newly established by using the establishing tool on the MFP 100 side. Accordingly, the time and labor for registering beforehand the flow definition data required by the system manager who manages the distribution server 200 can be reduced.

When the existing flow definition data can be used partially, desired flow definition data can be easily established by calling and editing the existing flow definition data, since time is required if the data is newly established.

If the flow definition data established by the respective MFPs is registered in the distribution server 200 at all times, because the amount of the flow definition data to be registered becomes huge, it can be selected whether to register the data. It is basically desired to throw away the data after use, and only the flow definition data, which can be reused, is registered.

A distribution management system according to a second embodiment of the present invention performs the distribution process by using the newly generated or edited flow definition data, and then it can be selected whether to register the flow definition data.

In the first embodiment, the flow-definition deleting unit 111 basically deletes the data, and the one which can be reused is exceptionally registered by using the flow-definition registering unit 112. In the second embodiment, however, after the distribution process is performed by using the newly generated or edited flow definition data, a selection screen is displayed on the display unit of the operation panel 113 in the MFP 100, so that it can be selected whether to register the flow definition data by using the operating unit 115 as a registration selecting unit (see Step S107 in FIG. 10).

When the user of the MFP 100 selects not to register the flow definition data by using the operating unit 115, even if the data is registered once in the system for performing the distribution process, the data is deleted after completion of the distribution process. Alternatively, the flow definition data is handled as temporary data until finishing the distribution process, and is automatically deleted after completion of the distribution process.

However, it is not always desired from a security or maintenance point of view in the distribution management system that the determination whether to register the newly generated or edited flow definition data is relegated to all the users. Therefore, it is desired to determine whether to grant the user an option to register the newly generated or edited flow definition data in the distribution server 200, according to the authorization held by the user.

For example, the control unit 103 as the authorization-data obtaining unit in the MFP 100 accesses the distribution server 200 via the remote communication unit 104 and the network 401 to obtain authorization data of the user from the processing unit 210 that stores the function programs. The control unit 103 determines whether the user has the authorization to register or delete data, based on the obtained authorization data (use-authorization determining unit). When the user has the registration or deletion authorization, the user uses the operating unit 115 as the selecting unit to select whether to register or delete the new or edited existing flow definition data.

After the distribution process is performed by using the newly generated or edited existing flow definition data, it can be inquired to the system manager whether to register the flow definition data (whether the flow definition data is to be registered or deleted).

In the distribution management system according to the second embodiment, after the distribution process is performed by using the newly generated or edited flow definition data, the selection screen on which it can be selected whether to register the flow definition data is displayed on the operation panel. Therefore, the user can consciously select whether to register or delete the data. Accordingly, it can be appropriately selected whether to register or delete the newly generated or edited flow definition data.

It is not always desired from the security or maintenance point of view in the distribution management system that the determination whether to register or delete the newly generated or edited flow definition data is left to all users of the MFP. In the distribution management system according to the second embodiment, therefore, after the distribution process is performed by using the newly generated or edited flow definition data, the authorization data held by the user is obtained from the distribution server 200 to determine whether to grant the user an option to register the newly generated or edited flow definition data, and it is determined whether the user has the registration or deletion authorization based on the obtained authorization data. Accordingly, only the user having the authorization can appropriately determine whether to register or delete the newly generated or edited flow definition data in the distribution server 200.

According to the first embodiment, it is assumed that a memory as the flow storage unit is provided to the distribution server 200 to register the flow definition data beforehand. However, if the user of the MFP that uses the flow definition data can generate desired flow definition data by using the operation panel, it can be considered that the flow definition data need not be registered in the distribution server 200 beforehand. That is, the user of the MFP 100 always transmits the image data obtained by scanning and the desired flow definition data established by using the operation panel to the distribution server 200, and the distribution server 200 having received the image data and the flow definition data can distribute the image data according to the received flow definition data. By having such a configuration, the memory for storing the flow definition data is not required on the distribution server 200 side.

The MFP 100 and the distribution server 200 according to the first and second embodiments include a control unit such as a central processing unit (CPU), a storage unit such as a read only memory (ROM) and a random access memory (RAM), an external storage unit such as the HDD or a compact disk (CD) drive, a display unit such as a display, and an input unit such as the keyboard or a mouse, and these have a hardware configuration using a workstation or a normal computer.

The distribution management program executed by the MFP 100 and the distribution server 200 according to the first and second embodiments is recorded on a computer readable recording medium such as a CD-ROM, a flexible disk (FD), a CD recordable (CD-R), or a digital versatile disk (DVD) in an installable format or executable format file and provided.

The distribution management program executed by the MFP 100 and the distribution server 200 according to the first and second embodiments can be stored on the computer connected to the network such as the Internet, and downloaded via the network. Further, the distribution management program executed by the MFP 100 and the distribution server 200 according to the first and second embodiments can be provided or distributed via the network such as the Internet.

The distribution management program executed by the MFP 100 and the distribution server 200 according to the first and second embodiments can be incorporated in the ROM or the like beforehand and provided.

The distribution management program executed by the MFP 100 and the distribution server 200 according to the first and second embodiments has a module configuration including the respective units (such as the scanner application, the printer application, the control unit, the remote communication unit, the display control unit, the input control unit, the flow-definition generating/editing unit, the flow-definition deleting unit, the flow-definition registering unit, and the processing unit, the flow execution control unit, and the flow-definition generating unit). As the actual hardware, the respective units are loaded on the main storage unit by reading the distribution management program from the recording medium and executing the distribution management program by the CPU (processor), so that the scanner application, the printer application, the control unit, the remote communication unit, the display control unit, the input control unit, the flow-definition generating/editing unit, the flow-definition deleting unit, the flow-definition registering unit, and the processing unit, the flow execution control unit, and the flow-definition generating unit are generated on the main storage unit.

According to the present invention, when flow definition data desired by the user is not present in the existing flow definition data of the distribution management apparatus, new flow definition data can be generated. Accordingly, the load on the system manager of the distribution management apparatus can be reduced.

The present invention is not limited to the above embodiments as they are, and can be embodied by modifying constituent elements without departing from the scope of the invention. Furthermore, various inventions can be created by combinations of the constituent elements disclosed in the above embodiments. For example, some of the whole constituent elements disclosed in the embodiments can be omitted. Further, the constituent elements according to different embodiments can be suitably combined with each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a process-flow calling unit that calls existing flow definition data defining a process flow of image data from a distribution management apparatus connected via a network;
a list display unit that displays thereon a list of flow definition data called by the process-flow calling unit;
a process-flow generating unit that generates new flow definition data, when desired flow definition data does not exist in the list displayed on the list display unit;
a flow display unit that displays thereon the flow definition data called by the process-flow calling unit;
a flow editing unit that edits the flow definition data displayed on the flow display unit; and
a flow deleting unit that deletes the new flow definition data generated by the process-flow generating unit or the flow definition data edited by the flow editing unit, after performing a distribution process by using the new flow definition data generated by the process-flow generating unit or the flow definition data edited by the flow editing unit.

2. The image processing apparatus according to claim 1, further comprising:
an authorization-data obtaining unit that obtains authorization data for authorizing a user from the distribution management apparatus, after performing a distribution process by using the new flow definition data generated by the process-flow generating unit or the flow definition data edited by the flow editing unit;
a usage-authorization determining unit that determines whether the user has an authorization to delete the new flow definition data generated by the process-flow generating unit or the flow definition data edited by the flow editing unit based on the authorization data obtained by the authorization-data obtaining unit; and
a selecting unit that allows the user having the authorization to select deletion of the new flow definition data generated by the process-flow generating unit or the flow definition data edited by the flow editing unit.

3. The image processing apparatus according to claim 1, wherein the process-flow generating unit includes:
a process-function obtaining unit that obtains a selectable process function from the distribution management apparatus, upon receiving an instruction of generating new flow definition data from a user,
a process-function display unit that displays thereon the process function obtained by the process-function obtaining unit,
a process-function selecting unit that selects a process function desired by the user from process functions displayed on the process-function display unit, and
a flow generating unit that generates the new flow definition data based on a selected process function.

4. The image processing apparatus according to claim 1, further comprising:
a flow registering unit that registers the new flow definition data generated by the process-flow generating unit or the flow definition data edited by the flow editing unit in a flow storage unit in the distribution management apparatus.

5. The image processing apparatus according to claim 4, further comprising:
a registration selecting unit that selects whether to register the new flow definition data generated by the process-flow generating unit or the flow definition data edited by the flow editing unit in the flow storage unit in the distribution management apparatus, after performing a distribution process by using the new flow definition data generated by the process-flow generating unit or the flow definition data edited by the flow editing unit.

6. The image processing apparatus according to claim 4, further comprising:
an authorization-data obtaining unit that obtains authorization data for authorizing a user from the distribution management apparatus, after performing a distribution process by using the new flow definition data generated by the process-flow generating unit or the flow definition data edited by the flow editing unit;
a usage-authorization determining unit that determines whether the user has an authorization to register the new flow definition data generated by the process-flow generating unit or the flow definition data edited by the flow editing unit based on the authorization data obtained by the authorization-data obtaining unit; and
a selecting unit that allows the user having the authorization to select registration of the new flow definition data generated by the process-flow generating unit or the flow definition data edited by the flow editing unit.

7. The image processing apparatus according to claim 4, further comprising,
a registration-request transmitting unit that transmits a registration request for registering the new flow definition data generated by the process-flow generating unit or the flow definition data edited by the flow editing unit to the distribution management apparatus, at a time of performing the distribution process by using the new flow definition data generated by the process-flow generating unit or the flow definition data edited by the flow editing unit.

8. A distribution management method for an image processing apparatus connected to a distribution management apparatus via a network, the distribution management method comprising:
generating new flow definition data defining a process flow of image data by using an operation panel of the image processing apparatus;
distribution requesting including
transmitting the new flow definition data generated at the generating and image data obtained by reading an original image to the distribution management apparatus, and
requesting a distribution of the image data to the distribution management apparatus;
causing the distribution management apparatus to distribute the image data based on the image data and the new flow definition data transmitted at the transmitting;
calling existing flow definition data defining a process flow of image data from the distribution management apparatus;
displaying the flow definition data called at the calling;
editing the flow definition data displayed at the displaying; and
deleting the new flow definition data generated at the generating or the flow definition data edited at the editing, after performing a distribution process by using the new flow definition data generated at the generating or the flow definition data edited at the editing.

9. The distribution management method according to claim 8, wherein the generating includes
obtaining a selectable process function from the distribution management apparatus, upon receiving an instruction of generating new flow definition data from a user;
displaying the process function obtained at the obtaining;
selecting a process function desired by the user from process functions displayed at the displaying; and
generating the new flow definition data based on a selected process function.

10. The distribution management method according to claim 8, further comprising:
obtaining authorization data for authorizing a user from the distribution management apparatus, after performing a distribution process by using the new flow definition data generated at the generating or the flow definition data edited at the editing;
determining whether the user has an authorization to delete the new flow definition data generated at the generating or the flow definition data edited at the editing based on the authorization data obtained at the obtaining; and
allowing the user having the authorization to select deletion of the new flow definition data generated at the generating or the flow definition data edited at the editing.

11. The distribution management method according to claim 8, further comprising registering the new flow definition data generated at the generating or the flow definition data edited at the editing in a flow storage unit in the distribution management apparatus.

12. The distribution management method according to claim 11, further comprising:
selecting whether to register the new flow definition data generated at the generating or the flow definition data edited at the editing in the flow storage unit in the distribution management apparatus, after performing a distribution process by using the new flow definition data generated at the generating or the flow definition data edited at the editing.

13. The distribution management method according to claim 11, further comprising
registration-request transmitting including transmitting a registration request for registering the new flow definition data generated at the generating or the flow definition data edited at the editing to the distribution management apparatus, at a time of performing the distribution process by using the new flow definition data generated at the generating or the flow definition data edited at the editing.

14. The distribution management method according to claim 11, further comprising:
obtaining authorization data for authorizing a user from the distribution management apparatus, after performing a distribution process by using the new flow definition data generated at the generating or the flow definition data edited at the editing;
determining whether the user has an authorization to register the new flow definition data generated at the generating or the flow definition data edited at the editing based on the authorization data obtained at the obtaining; and
allowing the user having the authorization to select registration of the new flow definition data generated at the generating or the flow definition data edited at the editing.

15. A non-transitory computer-readable recording medium that stores therein a computer program for distributing image data in an image processing apparatus connected to a distribution management apparatus via a network, the computer program causing a computer to execute:
generating new flow definition data defining a process flow of image data by using an operation panel of the image processing apparatus;
distribution requesting including
transmitting the new flow definition data generated at the generating and image data obtained by reading an original image to the distribution management apparatus, and
requesting a distribution of the image data to the distribution management apparatus;
causing the distribution management apparatus to distribute the image data based on the image data and the new flow definition data transmitted at the transmitting;
calling existing flow definition data defining a process flow of image data from the distribution management apparatus;
displaying the flow definition data called at the calling;
editing the flow definition data displayed at the displaying; and
deleting the new flow definition data generated at the generating or the flow definition data edited at the editing, after performing a distribution process by using the new flow definition data generated at the generating or the flow definition data edited at the editing.

* * * * *